US008299742B2

(12) United States Patent
Soliman et al.

(10) Patent No.: US 8,299,742 B2
(45) Date of Patent: Oct. 30, 2012

(54) SYSTEMS AND METHODS FOR DECELERATING A MOTOR IN A COMPUTER NUMERICAL CONTROLLED MACHINE TOOL

(75) Inventors: Joseph V. Soliman, Westlake Village, CA (US); German M. Chistokhodov, Newbury Park, CA (US); Barry D. Johnson, Thousand Oaks, CA (US); Robert M. Weston, Thousand Oaks, CA (US); Razmik G. Petrossians, Glendale, CA (US)

(73) Assignee: Haas Automation, Inc., Oxnard, CA (US)

( * ) Notice: Subject to any disclaimer, the term of this patent is extended or adjusted under 35 U.S.C. 154(b) by 463 days.

(21) Appl. No.: 12/750,459

(22) Filed: Mar. 30, 2010

(65) Prior Publication Data
US 2011/0241595 A1 Oct. 6, 2011

(51) Int. Cl.
*G05B 19/18* (2006.01)
(52) U.S. Cl. ........................... 318/569; 318/600
(58) Field of Classification Search .......... 318/569, 318/600, 456, 461
See application file for complete search history.

(56) References Cited

U.S. PATENT DOCUMENTS

| 5,218,281 | A | * | 6/1993 | Sasaki et al. | 318/600 |
| 6,429,612 | B1 | | 8/2002 | Kume et al. | |
| 6,551,033 | B2 | * | 4/2003 | Kakino et al. | 408/9 |
| 6,566,835 | B1 | * | 5/2003 | Yoshida et al. | 318/569 |
| 6,651,308 | B2 | * | 11/2003 | Oldani | 29/558 |
| 6,906,488 | B2 | * | 6/2005 | Hayashi | 318/567 |

OTHER PUBLICATIONS

Lynch, "Cycle Time Reduction Principles for CNC," Modern Machine Shop, Mar. 1996, pp. 1-3.
Swamy et al., "A Novel Stopping Method for Induction Motors Operating From Variable Frequency Drives," IEEE Transactions on Power Electronics, Jul. 2004, pp. 1100-1107, vol. 19, No. 4.

* cited by examiner

*Primary Examiner* — Rina Duda
(74) *Attorney, Agent, or Firm* — McDermott Will & Emery LLP

(57) ABSTRACT

A method for decelerating a motor in a computer numerical controlled machine tool is provided. The method includes calculating a present rate of deceleration $D_P$, for a motor of a motor drive system, based on a present speed $S_P$ of the motor, a reference speed $S_R$ of the motor, and a reference rate of deceleration $D_R$ of the motor. The method also includes decelerating the motor from $S_P$ according to $D_P$. The motor drive system comprises a maximum power rating that defines a maximum power, generated by the motor while decelerating, that can be dissipated without overloading the motor drive system. $D_R$ is a rate of deceleration such that power, generated by the motor while decelerating from $S_R$ according to $D_R$, is equal to the maximum power rating. Power, generated while decelerating the motor from $S_P$ according to $D_P$, is equal to or less than the maximum power rating.

20 Claims, 8 Drawing Sheets

300 calculate a present rate of deceleration $D_P$, for a motor of a motor drive system in a CNC machine tool, based on a present speed $S_P$ of the motor, a reference speed $S_R$ of the motor, and a reference rate of deceleration $D_R$ of the motor
S308 decelerate the motor from the present speed $S_P$ according to the present rate of deceleration $D_P$
S310

SYSTEMS AND METHODS FOR DECELERATING A MOTOR IN A COMPUTER NUMERICAL CONTROLLED MACHINE TOOL

FIELD

The present invention generally relates to deceleration of motors and, in particular, relates to systems and methods for decelerating a motor in a computer numerical controlled machine tool.

BACKGROUND

Machine tools are power-operated tools used for finishing or shaping parts. Machine tools operate by removing material from a workpiece. Basic machining operations include turning, facing, milling, drilling, boring, broaching, threading, and tapping. In addition, other operations include sawing, grinding, gear cutting, polishing, buffing, and honing. Computer numerical controlled (CNC) machine tools are machine tools that are operated by programmed commands stored in or entered into the CNC machine tool. When using a CNC machine tool to operate on a particular workpiece, the CNC machine tool may be programmed to operate at different speeds depending on the type of operation that is desired. Therefore, in order to reduce the total time spent operating on the workpiece, it is beneficial to quickly decelerate the motor in the CNC machine tool to the desired operating speed.

SUMMARY

According to various aspects of the subject disclosure, a method for decelerating a motor in a CNC machine tool is provided. The method comprises calculating a present rate of deceleration $D_P$, for a motor of a motor drive system in a CNC machine tool, based on a present speed $S_P$ of the motor, a reference speed $S_R$ of the motor, and a reference rate of deceleration $D_R$ of the motor. The method also comprises decelerating the motor from the present speed $S_P$ according to the present rate of deceleration $D_P$. The motor drive system comprises a maximum power rating. The maximum power rating defines a maximum power, generated by the motor while decelerating, that can be dissipated without overloading the motor drive system. The reference rate of deceleration $D_R$ is a rate of deceleration such that power, generated by the motor while decelerating from the reference speed $S_R$ according to the reference rate of deceleration $D_R$, is equal to the maximum power rating. Power, generated while decelerating the motor from the present speed $S_P$ according to the present rate of deceleration $D_P$, is equal to or less than the maximum power rating.

According to certain aspects of the subject disclosure, a CNC machine tool system is provided. The system comprises a motor drive system comprising a motor. The system also comprises a controller configured to calculate a present rate of deceleration $D_P$ for the motor based on a present speed $S_P$ of the motor, a reference speed $S_R$ of the motor, and a reference rate of deceleration $D_R$ of the motor. The controller is further configured to execute an instruction for decelerating the motor from the present speed $S_P$ according to the present rate of deceleration $D_P$. The motor drive system comprises a maximum power rating. The maximum power rating defines a maximum power, generated by the motor while decelerating, that can be dissipated without overloading the motor drive system. The reference rate of deceleration $D_R$ is a rate of deceleration such that power, generated by the motor while decelerating from the reference speed $S_R$ according to the reference rate of deceleration $D_R$, is equal to the maximum power rating. Power, generated while decelerating the motor from the present speed $S_P$ according to the present rate of deceleration $D_P$, is equal to or less than the maximum power rating.

According to various aspects of the subject disclosure, a controller for a CNC machine tool system is provided. The controller comprises a memory module containing executable instructions. The controller also comprises a processor configured to execute the instructions to perform a method. The method comprises calculating a present rate of deceleration $D_P$ for a motor of a motor drive system in a CNC machine tool based on a present speed $S_P$ of the motor, a reference speed $S_R$ of the motor, and a reference rate of deceleration $D_R$ of the motor. The method also comprises decelerating the motor from the present speed $S_P$ according to the present rate of deceleration $D_P$. The motor drive system comprises a maximum power rating. The maximum power rating defines a maximum power, generated by the motor while decelerating, that can be dissipated without overloading the motor drive system. The reference rate of deceleration $D_R$ is a rate of deceleration such that power, generated by the motor while decelerating from the reference speed $S_R$ according to the reference rate of deceleration $D_R$, is equal to the maximum power rating. Power, generated while decelerating the motor from the present speed $S_P$ according to the present rate of deceleration $D_P$, is equal to or less than the maximum power rating.

According to various aspects of the subject disclosure, a machine-readable medium encoded with executable instructions for decelerating a motor in a CNC machine tool is provided. The instructions comprise code for calculating a present rate of deceleration $D_P$, for a motor of a motor drive system in a CNC machine tool, based on a present speed $S_P$ of the motor, a reference speed $S_R$ of the motor, and a reference rate of deceleration $D_R$ of the motor. The instructions also comprise code for decelerating the motor from the present speed $S_P$ according to the present rate of deceleration $D_P$. The motor drive system comprises a maximum power rating. The maximum power rating defines a maximum power, generated by the motor while decelerating, that can be dissipated without overloading the motor drive system. The reference rate of deceleration $D_R$ is a rate of deceleration such that power, generated by the motor while decelerating from the reference speed $S_R$ according to the reference rate of deceleration $D_R$, is equal to the maximum power rating. Power, generated while decelerating the motor from the present speed $S_P$ according to the present rate of deceleration $D_P$, is equal to or less than the maximum power rating.

Additional features and advantages of the subject disclosure will be set forth in the description below, and in part will be apparent from the description, or may be learned by practice of the subject disclosure. The advantages of the subject disclosure will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject disclosure and are incorporated in and constitute a part of this specification, illustrate aspects of the subject disclosure and together with the description serve to explain the principles of the subject disclosure.

DETAILED DESCRIPTION

In the following detailed description, numerous specific details are set forth to provide a full understanding of the subject disclosure. It will be apparent, however, to one ordinarily skilled in the art that the subject disclosure may be practiced without some of these specific details. In other instances, well-known structures and techniques have not been shown in detail so as not to obscure the subject disclosure.

Figure 1:
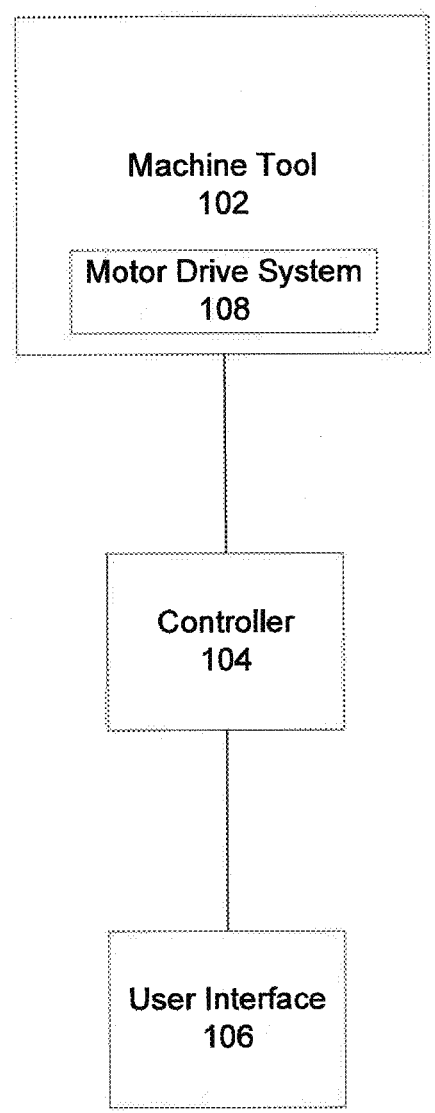
FIG. 1 is a block diagram illustrating components of a CNC machine tool system, in accordance with various aspects of the subject disclosure.

FIG. 1 is a block diagram illustrating components of CNC machine tool system 100, in accordance with various aspects of the subject disclosure. CNC machine tool system 100 comprises machine tool 102, controller 104, and user interface 106. Machine tool 102 comprises motor drive system 108. The operation of machine tool 102 is controlled by one or more programs stored in or entered into controller 104, for example. Thus, an operator of CNC machine tool system 100 may control operation of machine tool 102 by selecting, modifying, and/or creating programs stored in controller 104 via user interface 106.

Machine tool 102 may be any suitable power operated machine tool known to those of ordinary skill in the art. Motor drive system 108 comprises a motor that uses electrical energy in order to produce mechanical energy to operate machine tool 102. Controller 104 controls how much electrical energy is supplied to the motor so that the electrical energy can be converted into mechanical energy for removing material from a workpiece using machine tool 102. For example, the motor may be coupled to machine tool 102 for cutting and/or shaping a workpiece. Controller 104 may control an amount of current supplied to motor drive system 108 to determine a rotational speed of the motor. The current may relate to metal removal rates or force. For example, the current may be increased to maintain speed or increase force. In some aspects, the motor of motor drive system 108 may comprise a servo or spindle motor.

Controller 104 may comprise a computer, a processor, and/or other suitable processing units for controlling the operation of CNC machine tool system 100. User interface 106 may comprise a display screen, a sound system, a keyboard, a mouse, a touch screen, or any other suitable device to allow interaction between controller 104 and an operator of CNC machine tool system 100. Controller 104 may communicate information, such as the rotational speed and/or deceleration rate of the motor, to an operator of CNC machine tool system 100 via user interface 106.

Figure 2:
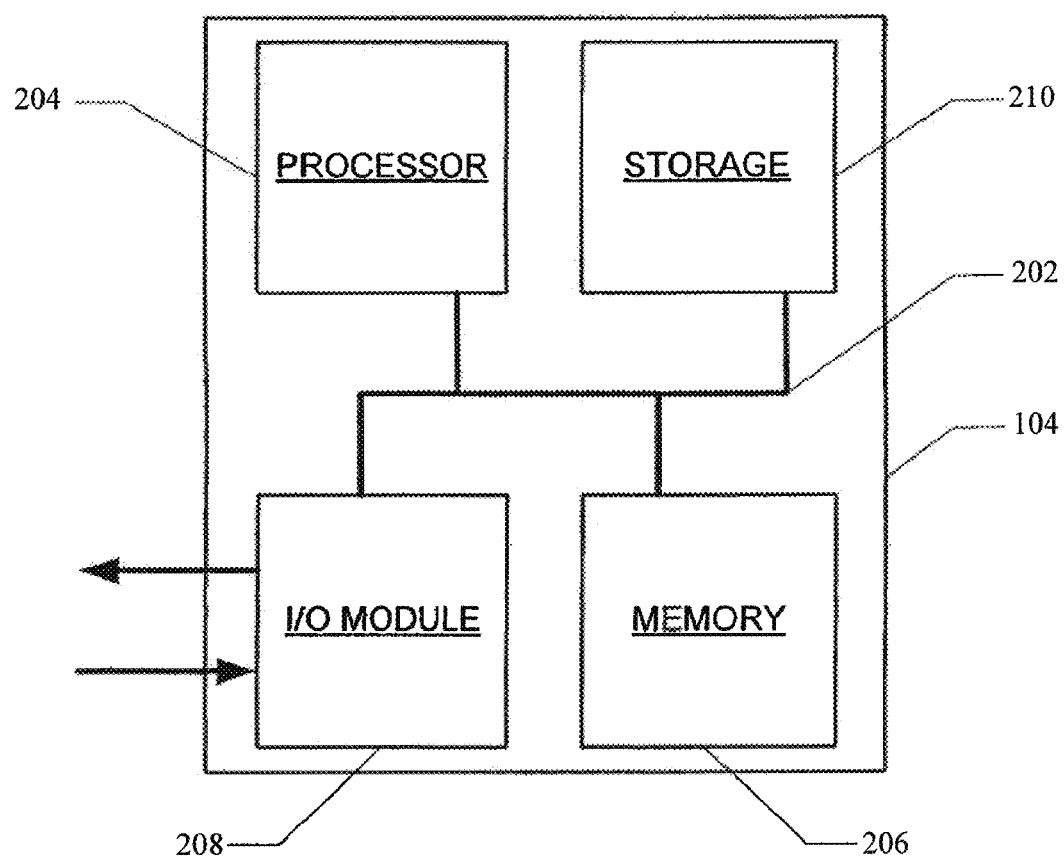
FIG. 2 is a block diagram illustrating components of a controller, in accordance with various aspects of the subject disclosure.

FIG. 2 is a block diagram illustrating components of controller 104, in accordance with various aspects of the subject disclosure. Controller 104 comprises processor module 204, storage module 210, input/output (I/O) module 208, memory module 206, and bus 202. Bus 202 may be any suitable communication mechanism for communicating information. Processor module 204, storage module 210, I/O module 208, and memory module 206 are coupled with bus 202 for communicating information between any of the modules of controller 104 and/or information between any module of controller 104 and a device external to controller 104. For example, information communicated between any of the modules of controller 104 may include instructions and/or data. In some aspects, bus 202 may be a universal serial bus. In some aspects, bus 302 may provide Ethernet connectivity.

In some aspects, processor module 204 may comprise one or more processors, where each processor may perform different functions or execute different instructions and/or processes. For example, one or more processors may execute instructions for operating machine tool 102, one or more processors may execute instructions for decelerating a motor of motor drive system 108, and one or more processors may execute instructions for input/output functions.

Memory module 206 may be random access memory ("RAM") or other dynamic storage devices for storing information and instructions to be executed by processor module 204. Memory module 206 may also be used for storing temporary variables or other intermediate information during execution of instructions by processor 204. In some aspects, memory module 206 may comprise battery-powered static RAM, which stores information without requiring power to maintain the stored information. Storage module 210 may be a magnetic disk or optical disk and may also store information and instructions. In some aspects, storage module 210 may comprise hard disk storage or electronic memory storage (e.g., flash memory). In some aspects, memory module 206 and storage module 210 are both a machine-readable medium.

Controller 104 is coupled via I/O module 208 to user interface 106 of FIG. 1 for providing information to and receiving information from an operator of CNC machine tool system 100. For example, user interface 106 may be a cathode ray tube ("CRT") or LCD monitor for displaying information to an operator. User interface 106 may also include, for example, a keyboard or a mouse coupled to controller 104 via I/O module 208 for communicating information and command selections to processor module 204.

According to various aspects of the subject disclosure, methods described herein are executed by controller 104. Specifically, processor module 204 executes one or more sequences of instructions contained in memory module 206 and/or storage module 210. In one example, instructions may be read into memory module 206 from another machine-readable medium, such as storage module 210. In another example, instructions may be read directly into memory module 206 from I/O module 208, for example from an operator of CNC machine tool system 100 via user interface 106. Execution of the sequences of instructions contained in memory module 206 and/or storage module 210 causes processor module 204 to perform methods to decelerate a motor of motor drive system 108. For example, a computational algorithm for decelerating the motor of motor drive system 108 may be stored in memory module 206 and/or storage module 210 as one or more sequences of instructions. Information such as the rotational speed and/or deceleration rate of the motor may be communicated from processor module 204 to memory module 206 and/or storage module 210 via bus 202 for storage. In some aspects, the information may be communicated from processor module 204, memory module 206, and/or storage module 210 to I/O module 208 via bus 202. The information may then be communicated from I/O module 208 to an operator of CNC machine tool system 100 via user interface 106.

One or more processors in a multi-processing arrangement may also be employed to execute the sequences of instructions contained in memory module 206 and/or storage module 210. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 204 for execution. Such a medium may take many forms, including, but not limited to, non-volatile media, volatile media, and transmission media. Non-volatile media include, for example, optical or magnetic disks, such as storage module 210. Volatile media include dynamic memory, such as memory module 206. Transmission media include coaxial cables, copper wire, and fiber optics, including the wires that comprise bus 202. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Figure 3A:
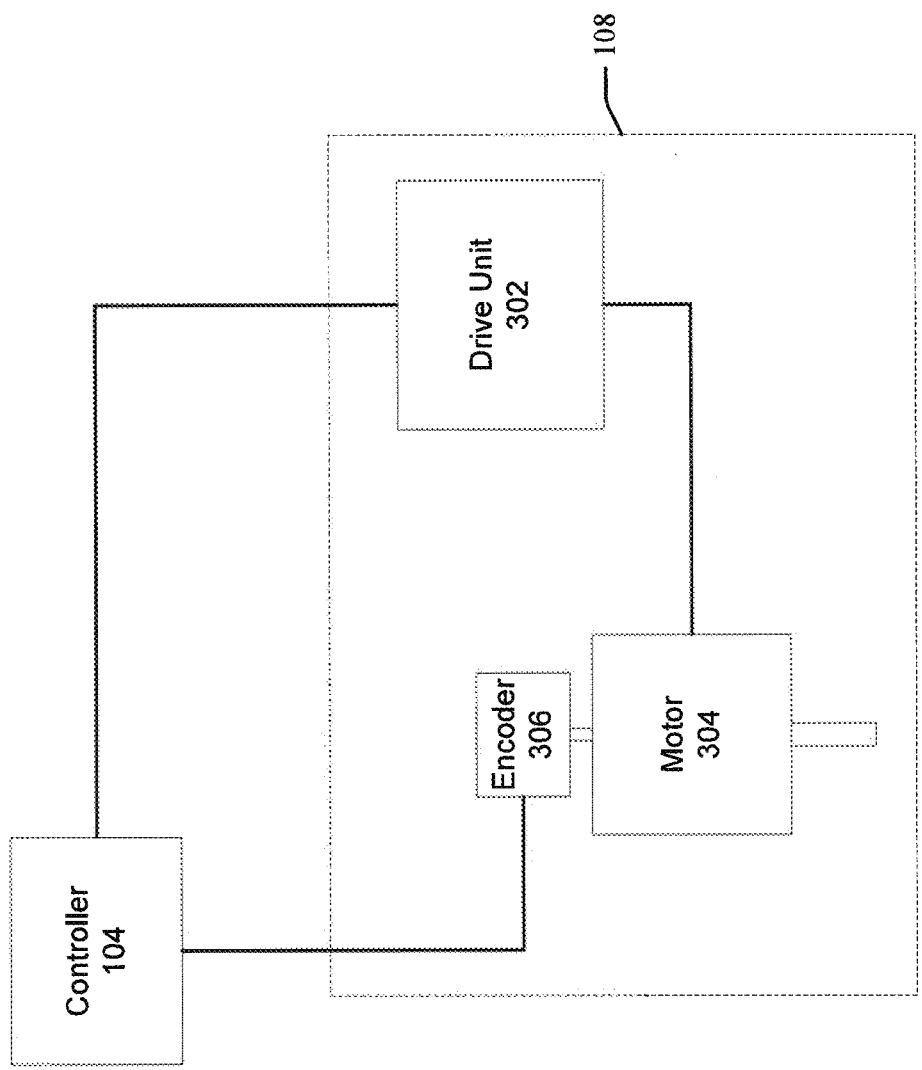
FIG. 3A is a block diagram illustrating a controller and components of a motor drive system, in accordance with various aspects of the subject disclosure.

FIG. 3A is a block diagram illustrating controller 104 and components of motor drive system 108, in accordance with various aspects of the subject disclosure. Motor drive system 108 comprises drive unit 302, motor 304, and encoder 306. As discussed above, controller 104 controls the amount of electrical energy supplied to motor 304 so that the electrical energy can be converted into mechanical energy for removing material from a workpiece using machine tool 102. For example, motor 304 may be coupled to machine tool 102 (as shown in FIG. 1) for cutting and/or shaping a workpiece. In some aspects, controller 104 communicates control signals to drive unit 302 to control how much electrical energy drive unit 302 supplies to motor 304 for controlling the rotational speed of motor 304. Drive unit 302, for example, may be a variable-frequency vector drive that is a current-source for driving motor 304. Encoder 306 is coupled to motor 304. In some aspects, encoder 306 monitors the operation of motor 304 and communicates information about the operation of motor 304 to controller 104. This information may include, for example, the rotational position of a spindle of motor 304. In some aspects, the rotational position of the spindle of motor 304 is expressed in encoder-steps. Each encoder-step may represent a certain degree and/or distance the spindle of motor 304 has rotated. Controller 104 may then use this information, for example, as feedback for determining the rotational speed of motor 304.

When motor 304 decelerates, the kinetic energy of motor 304 is decreased and converted into potential energy. Given that power is the rate at which energy is converted, the deceleration of motor 304 results in the generation of power. The faster motor 304 is decelerated, the more kinetic energy of motor 304 is converted in a given time period, resulting in more power being generated. In contrast, the slower motor 304 is decelerated, the less kinetic energy of motor 304 is converted in a given time period, resulting in less power being generated. Thus, the rate of deceleration of motor 304 is proportional to the power generated while decelerating motor 304.

Motor drive system 108 may comprise one or more power dissipators (not shown) for dissipating the power generated while decelerating motor 304. In some aspects, the one or more power dissipators may include a braking resistor, a transistor, and/or a capacitor. In some aspects, the maximum rate of deceleration of motor 304 is limited by how much power can be safely dissipated without overloading motor drive system 108. If more power is generated than what can be dissipated by the one or more power dissipators, motor drive system 108 may overload, and the operation of CNC machine tool system 100 may be shutdown to allow motor drive system 108 to recover. On the other hand, generating less power than what can be dissipated by the one or more power dissipators may indicate that motor 304 can be decelerated at a faster rate without having to be concerned with overloading motor drive system 108.

Aspects of the subject disclosure provide a method for decelerating motor 304 at a maximum rate without overloading motor drive system 108. Motor drive system 108 comprises a maximum power rating that defines a maximum power, generated by motor 304 while decelerating, that can be dissipated without overloading motor drive system 108. In some aspects, the maximum power rating is an average power rating of the one or more power dissipators. Aspects of the subject disclosure provide a method for decelerating motor 304 such that power, generated while decelerating motor 304, is equal to the maximum power rating in order to obtain a maximum rate of deceleration for motor 304.

Figure 3B:
FIG. 3B illustrates an example of a method for decelerating a motor, in accordance with various aspects of the subject disclosure.

FIG. 3B illustrates an example of method 300 for decelerating motor 304, in accordance with various aspects of the subject disclosure. One or more sequences of instructions used to perform method 300 may be stored in memory module 206 and/or storage module 210. Processor module 204 may execute these sequences of instructions to control the rotational speed of motor 304 for its deceleration upon detection of a command to decelerate motor 304 (e.g., the command may be issued from an operator of CNC machine tool system 100 via user interface 106). Method 300 comprises step S308 of calculating a present rate of deceleration $D_P$ for motor 304 based on a present speed $S_P$ of motor 304, a reference speed $S_R$ of motor 304, and a reference rate of deceleration $D_R$ of motor 304. Method 300 also comprises step S310 of decelerating motor 304 from the present speed $S_P$ according to the present rate of deceleration $D_P$.

Referring to step S308, the present speed $S_P$ of motor 304 may be determined by controller 104. For example, controller 104 may receive the rotational position of a spindle of motor 304 from encoder 306 and calculate the present speed $S_P$ of motor 304 based on the degree and/or distance the spindle of motor 304 has rotated in a given amount of time. The present speed $S_P$ may be stored in memory module 206 and/or storage module 210 so that processor module 204 may retrieve this information for calculating the present rate of deceleration $D_P$.

The reference rate of deceleration $D_R$ of motor 304 is a rate of deceleration for motor 304 such that power, generated by motor 304 while decelerating from a reference speed $S_R$ according to the reference rate of deceleration $D_R$, is equal to the maximum power rating of motor drive system 108. In some aspects, the reference speed $S_R$ may be selected as any speed between zero and the maximum rotational speed of motor 304. However, the reference speed $S_R$ is not limited to this range and can be selected at speeds beyond this range provided that the reference rate of deceleration $D_R$ can be determined using the selected reference speed $S_R$.

In some aspects, the reference rate of deceleration $D_R$ may be determined by decelerating motor 304 from the reference speed $S_R$ according to a test rate of deceleration, and determining the power generated while decelerating motor 304 at the test rate of deceleration. This process may be repeated with an increased test rate of deceleration until the power generated while decelerating motor 304 at the test rate of deceleration reaches the maximum power rating of motor drive system 108. The test rate of deceleration corresponding to the maximum power rating may be designated as the reference rate of deceleration $D_R$. Thus, according to certain aspects, the reference rate of deceleration $D_R$ is a maximum rate of deceleration, when decelerating from the reference speed $S_R$, that motor 304 is capable of achieving without overloading motor drive system 108. The reference speed $S_R$ and reference rate of deceleration $D_R$ may be stored in memory module 206 and/or storage module 210 so that processor module 204 may retrieve this information for calculating the present rate of deceleration $D_P$.

Aspects of the subject disclosure provide a method for calculating a maximum rate of deceleration from a present speed $S_P$ of motor 304. In some aspects, the present rate of deceleration $D_P$ can be calculated to be a maximum rate of deceleration from the present speed $S_P$ of motor 304 using the reference rate of deceleration $D_R$ and the reference speed $S_R$. Thus, the present rate of deceleration $D_P$ is calculated based on the present speed $S_P$, the reference speed $S_R$, and the reference rate of deceleration $D_R$.

According to various aspects of the subject disclosure, the present rate of deceleration $D_P$ may be given by:

$$D_R \left(\frac{S_R}{S_P}\right)^2 K_1 - K_2 \qquad (1)$$

where $K_1$ and $K_2$ are calibration constants and $$K_1 \geq \frac{K_2}{D_R \left(\frac{S_R}{S_P}\right)^2}.$$

The calibration constants $K_1$ and $K_2$ may be values provided by an operator of machine tool system 100 and stored into memory module 206 and/or storage module 210. Thus, processor module 204 may retrieve $K_1$, $K_2$, the reference rate of deceleration $D_R$, the reference speed $S_R$, and the present speed $S_P$ from memory module 206 and/or storage module 210 for calculating the present rate of deceleration $D_P$. In some aspects, $K_1=1$ and $K_2=0$. When $K_1=1$ and $K_2=0$, the present rate of deceleration $D_P$ may be the maximum rate of deceleration of motor 304 when decelerating from the present speed $S_P$.

In some aspects, $K_1$ and $K_2$ may be safety constants that can be adjusted such that the present rate of deceleration $D_P$ is less than the maximum rate of deceleration when decelerating from the present speed $S_P$ (e.g., the power generated while decelerating motor 304 is less than the maximum power rating). This may be beneficial in providing insurance that motor drive system 108 will not overload. This may also be beneficial in situations where excessive machine vibrations occur due to machine tool 102 being unbalanced when mounted onto CNC machine tool system 100. In order to ensure stability, $K_1$ and $K_2$ may be adjusted such that the motor 304 is not decelerating at the maximum rate of deceleration.

In some aspects, $K_1$ and $K_2$ may be adjusted such that the present rate of deceleration $D_P$ may be greater than the maximum rate of deceleration (e.g., the power generated while decelerating motor 304 is greater than the maximum power rating). This may be beneficial if CNC machine tool system 100 provides an internal safety mechanism for sustaining an overload for a certain period of time, and an operator desires to override the shut down of CNC machine tool system 100 in order to decelerate motor 304 quickly for emergency purposes. In some aspects, by adjusting the calibration constants $K_1$ and $K_2$, the power generated while decelerating motor 304 from the present speed $S_P$ according to the present rate of deceleration $D_P$ may be equal to or less than the maximum power rating. In some aspects, the power may even be greater than the maximum power rating.

Referring to step S310, motor 304 is decelerated from the present speed $S_P$ according to the present rate of deceleration $D_P$ calculated in step S308. For example, controller 104 may communicate information to drive unit 302 for supplying an appropriate amount of electrical energy to motor 304 for controlling the rotational speed of motor 304 such that motor 304 decelerates according to the calculated present rate of deceleration $D_P$. Power generated while decelerating motor 304 may be dissipated by the one or more power dissipators of motor drive system 108.

Figure 4:
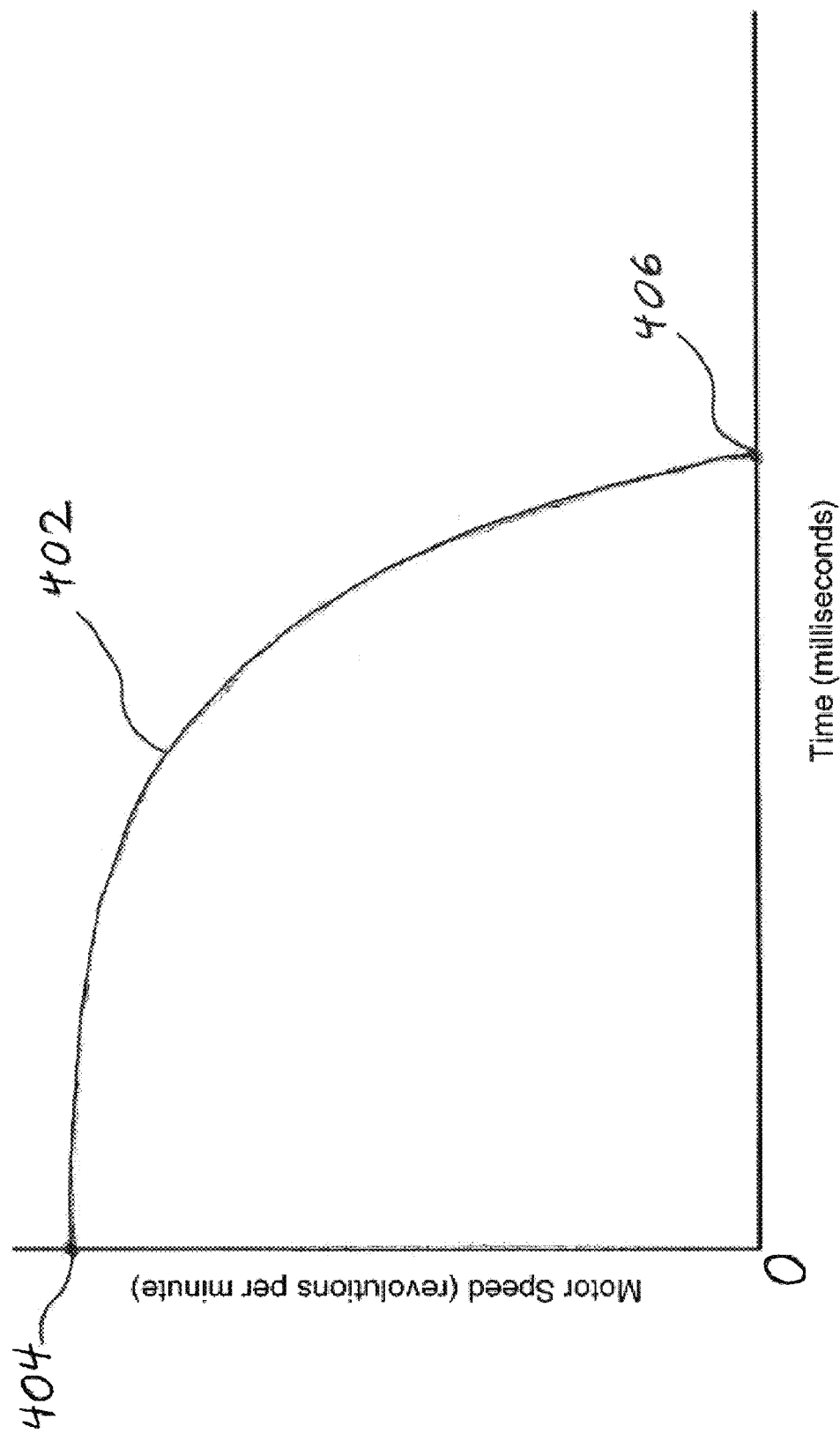
FIG. 4 illustrates an example of a deceleration profile of a motor, in accordance with various aspects of the subject disclosure.

FIG. 4 illustrates an example of deceleration profile 402 of motor 304, in accordance with various aspects of the subject disclosure. In FIG. 4, a sample plot of the rotational speed of motor 304 in revolutions per minute (RPM) versus time in milliseconds is shown. Deceleration profile 402 illustrates an example of the deceleration of motor 304 when motor 304 is decelerating according to equation (1). As shown in equation (1), the deceleration of motor 304 is proportional to the square of the speed at which motor 304 rotates. Thus, motor 304 decelerates non-linearly from point 404 to point 406, as illustrated by deceleration profile 402. In some aspects, any speed of motor 304 between zero (e.g., at point 406) and the maximum rotational speed of motor 304 (e.g., at point 404) may be selected as the reference speed $S_R$. In some aspects, once the reference speed $S_R$ is selected, the reference rate of deceleration $D_R$ may then be determined.

According to various aspects of the subject disclosure, the reference speed $S_R$ may serve the dual purpose for determining the reference rate of deceleration $D_R$ and for acting as a switch point at which motor 304 changes from decelerating non-linearly to decelerating linearly. This may be beneficial, for example, in situations where machine tool system 100 is used in a machine process that includes a tapping operation on a given workpiece. For example, in the machine process, machine tool 102 may use a first cutting tool (e.g., a drill) to form a hole in the workpiece. The machine process also involves machine tool 102 switching from the first cutting tool to a different second cutting tool (e.g., another drill) used to form threads in the hole. Thus, after the first cutting tool has formed the hole in the workpiece, the cutting tool is decelerated to a stop so that machine tool 102 may switch to the second cutting tool. The machine process also includes a tapping operation, which involves rotating the second cutting tool with motor 304 while moving the second cutting tool along its axis into the hole, in order to form threads in the hole. Motor 304 is accelerated (and hence the rotation of the second cutting tool) as the second cutting tool is fed into the hole to form the threads. Once motor 304 reaches a certain speed, deceleration of motor 304 is initiated such that the second cutting tool stops rotating when the second cutting tool reaches a desired depth of the hole at which to stop forming threads. After this, the rotation of the second cutting tool may be reversed so that the second cutting tool may be retracted from the hole while rotating in the reverse direction to preserve the threads formed in the hole.

Because the second cutting tool is typically moved along its axis at a linear rate, it is advantageous to decelerate motor 304 (and hence the rotation of the second cutting tool) linearly while the second cutting tool is forming threads in the hole so that the rotation of the second cutting tool is synchronized with the linear movement of the second cutting tool along its axis. Doing so will result in the creation of uniformly spaced threads in the hole of the workpiece. Thus, the machine process described above involves decelerating motor 304 at various stages. For example, motor 304 is decelerated to bring the first cutting tool to a stop so that machine tool 102 may switch to the second cutting tool. Motor 304 is also decelerated while the second cutting tool is forming threads in the hole. Therefore, in order to reduce the total amount of time spent for the machine process, it is beneficial to decelerate motor 304 non-linearly (e.g., using equation (1)) to obtain a maximum rate of deceleration for decelerating the first cutting tool to a stop so that machine tool 102 may switch to the second cutting tool. Because the machine process also involves decelerating motor 304 linearly (e.g., during the tapping operation), it is also beneficial to provide a method for decelerating motor 304 that takes into account both non-linear deceleration (e.g., using equation (1)) and linear deceleration (e.g., for decelerating the second cutting tool when the second cutting tool is forming threads in the hole).

In the method of decelerating motor 304 that takes into account both non-linear and linear deceleration, the reference speed $S_R$ may be used as a switch point at which motor 304 changes from decelerating non-linearly to decelerating linearly. According to certain aspects, the reference speed $S_R$ may be selected with reference to the tapping operation. In the tapping operation, the rotation of the second cutting tool is accelerated as it is fed into the hole of the workpiece to form threads in the hole. Once the second cutting tool reaches a certain speed, deceleration of the second cutting tool is initiated such that the second cutting tool stops rotating when the second cutting tool reaches a desired depth of the hole at which to stop forming threads. Thus, the reference speed $S_R$ may be selected as the speed at which the second cutting tool begins decelerating. In other words, the reference speed $S_R$ may be the highest speed that the second cutting tool attains before it begins decelerating during the tapping operation. In some aspects, the reference speed $S_R$ is selected based on the rate at which the second cutting tool is moved along its axis, the desired depth of the hole to be drilled, the desired spacing of the threads formed in the hole, and other factors known to those of ordinary skill in the art.

Figure 5:
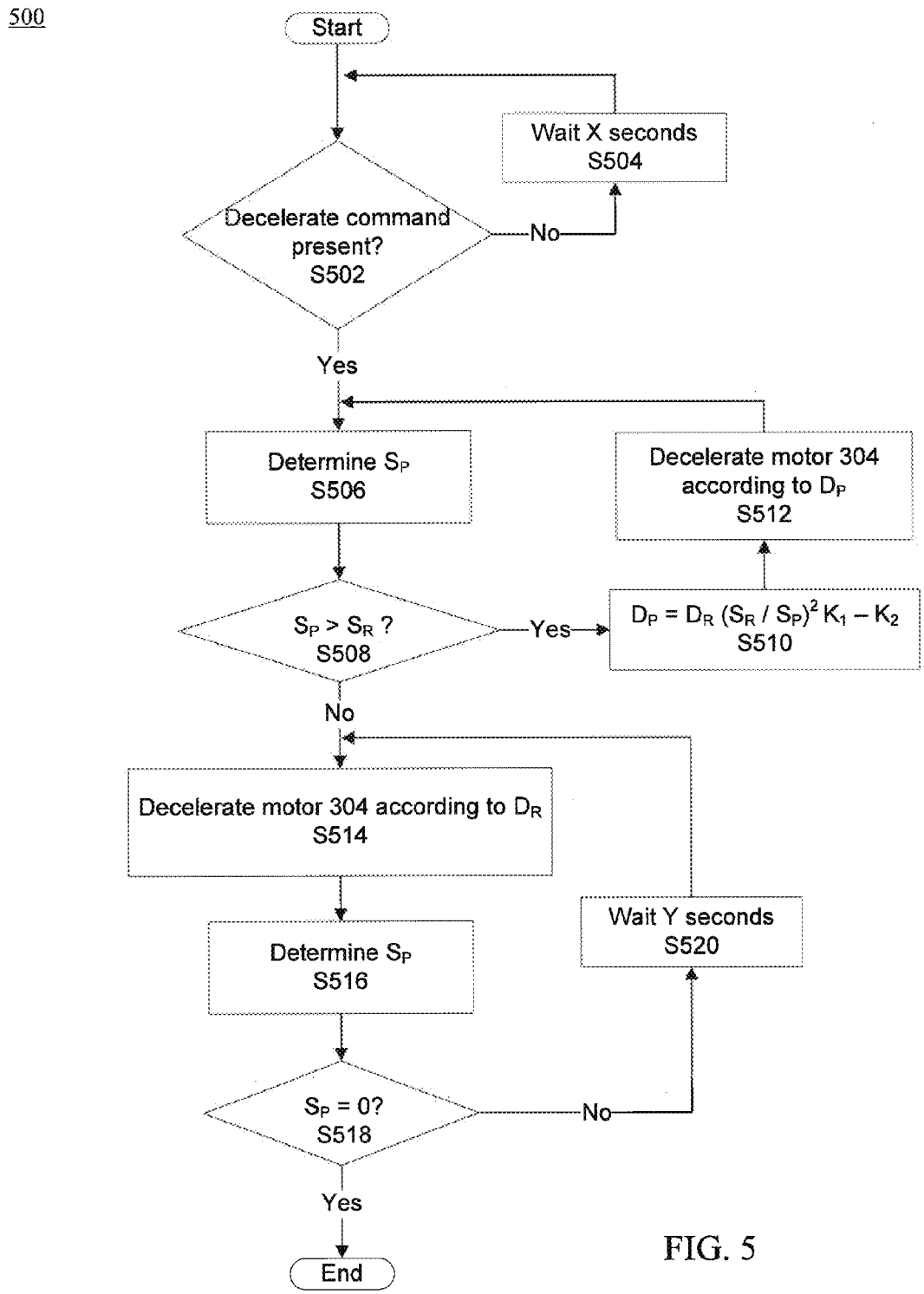
FIG. 5 illustrates an example of a method for decelerating a motor, in accordance with various aspects of the subject disclosure.

FIG. 5 illustrates an example of method 500 for decelerating motor 304, in accordance with various aspects of the subject disclosure. For example, method 500 may be beneficially implemented for the machine process as described with respect to FIG. 4, and takes into account both non-linear deceleration (e.g., using equation (1) to obtain a maximum rate of deceleration for decelerating the first cutting tool) and linear deceleration (e,g, for decelerating the second cutting tool when the second cutting tool is forming threads in the hole). One or more sequences of instructions used to perform method 500 may be stored in memory module 206 and/or storage module 210. Processor module 204 may continually execute these sequences of instructions to control the rotational speed of motor 304 for its deceleration.

In some aspects, controller 104 may begin execution of method 500 (e.g., an initialization process at the "Start" of method 500 before step S502 is executed) after motor 304 has begun operating. For example, during the initialization process, motor 304 is already rotating at an initial speed. This may be because CNC machine tool system 100 has just been turned on and a default rotational speed (e.g., a maximum rotational speed) for motor 304 is automatically set as the initial speed. In some aspects, motor 304 may already be rotating at the initial speed because motor tool 102 has just finished a previous operation that involved motor 304's rotation at the initial speed.

At the same time or after the initialization process, controller 104 begins executing method 500. In the initialization process, variables associated with method 500 may be set to certain values before the steps of method 500 are executed. For example, both the reference speed $S_R$ and the reference rate of deceleration $D_R$ may be initially determined by an operator of CNC machine tool system 100. These variables may be stored in memory module 206 and/or storage module 210, for example, for use by processor module 204 in calculating the present rate of deceleration $D_P$.

Referring to step S502, controller 104 determines if a decelerate command is present. A decelerate command may be present, for example, when machine tool 102 is instructed to decelerate according to the machine process described with respect to FIG. 4 (e.g., decelerating either the first cutting tool or the second cutting tool). Thus, in reference to the machine process with the first cutting tool, motor 304 may be instructed to decelerate so that the first cutting tool can be stopped so that machine tool 102 can switch to the second cutting tool. In reference to the machine process with the second cutting tool, motor 304 may be instructed to decelerate so that the second cutting tool may stop rotating once the second tool reaches a desired depth of the hole at which to stop forming threads. According to step S504, if no decelerate command is present, then controller 104 waits X seconds before proceeding to step S502 again. The amount of time controller 104 waits may vary depending on the type of processor used in controller 104, the amount of processing bandwidth available, or other factors known to those of ordinary skill in the art. For example, if controller 104 is currently performing multiple operations that require its immediate attention, then the amount of time controller 104 waits may be longer as compared to when controller 104 has a larger amount of processing bandwidth available.

According to step S506, if the decelerate command is present, then controller 104 determines the present speed $S_P$ of motor 304. In some aspects, controller 104 determines the present speed $S_P$ of motor 304 by receiving the rotational position of a spindle of motor 304 from encoder 306 and calculating the present speed $S_P$ of motor 304 based on the degree and/or distance the spindle of motor 304 has rotated in a given amount of time.

According to certain aspects, the reference speed $S_R$ may be selected as described with respect to FIG. 4. This reference speed $S_R$ may be retrieved from memory module 206 and/or storage module 210 so that, under step S508, the present speed $S_P$ can be compared to the reference speed $S_R$. If the present speed $S_P$ is greater than the reference speed $S_R$, then the present rate of deceleration $D_P$ is determined according to equation (1). That is, controller 104 calculates the present rate of deceleration $D_P$ as $$D_R\left(\frac{S_R}{S_P}\right)^2 K_1 - K_2,$$

according to step S510. Once the present rate of deceleration $D_P$ has been calculated, motor 304 is decelerated according to the present rate of deceleration $D_P$, according to step S512. For example, controller 104 controls the amount of electrical energy that drive unit 302 supplies to motor 304 in order to control the rotation of motor 304 such that motor 304 decelerates according to the present rate of deceleration $D_P$. In this regard, motor 304 is decelerated non-linearly (e.g., according to equation (1) to obtain a maximum rate of deceleration). Thus, in reference to the machine process with the first cutting tool, the first cutting tool is decelerated at a maximum rate of deceleration at this stage, allowing for a reduction in the total amount of time spent for the machine process. In reference to the machine process with the second cutting tool, the second cutting tool is not decelerated at this stage because, by definition of the reference speed $S_R$, the present speed $S_P$ of the second cutting tool during the tapping operation will not be greater than the reference speed $S_R$. This effectively ensures that motor 304 will not decelerate non-linearly according to equation (1) when the second cutting tool is forming threads within the hole. After step S512, the present speed $S_P$ of motor 304 is determined again according to step S506.

Referring to steps S508 and S514, if the present speed $S_P$ is not greater than the reference speed $S_R$, then motor 304 is decelerated according to the reference rate of deceleration $D_R$ (e.g., a constant linear rate of deceleration). In this regard, motor 304 is decelerated linearly regardless of whether machine tool 102 is using the first cutting tool or the second cutting tool. Thus, in reference to the machine process with the first cutting tool, if the present speed $S_P$ is equal to the reference speed $S_R$, then the first cutting tool begins decelerating to a stop according to the reference rate of deceleration $D_R$. In reference to the machine process with the second cutting tool, if the present speed $S_P$ is equal to the reference speed $S_R$, the rotation of the second cutting tool begins decelerating such the second cutting tool may stop rotating once the second tool reaches a desired depth of the hole at which to stop forming threads. In this case, the rotation of the second cutting tool may be decelerated linearly, allowing the second cutting tool to move along its axis into the hole at a linear rate and form uniform threads in the hole. According to step S516, the present speed $S_P$ is determined again. According to steps S518 and S520, if the present speed $S_P$ is not zero (e.g., indicating that motor 304 is still operating), then controller 104 waits Y seconds before proceeding to step S514 again. The amount of time controller 104 waits may vary depending on the type of processor used in controller 104, the amount of processing bandwidth available, or other factors known to those of ordinary skill in the art. For example, if controller 104 is currently performing multiple operations that require its immediate attention, then the amount of time controller 104 waits may be longer as compared to when controller 104 has a larger amount of processing bandwidth available.

If it is determined that the present speed $S_P$ is zero (e.g., indicating that that motor 304 has stopped rotating), then method 500 has completed. In reference to the machine process with the first cutting tool, the first cutting tool has decelerated to a stop and machine tool 102 may switch to the second cutting tool. In reference to the machine process with the second cutting tool, the second cutting tool has completed the tapping operation, thus forming threads in the hole of the workpiece. At this point, the rotation of motor 304 may be reversed and the second cutting tool may be retracted from the threaded hole of the workpiece. According to certain aspects, method 500 may be used for the machine process described with respect to FIG. 4. Method 500 allows for a reduction in the total amount of time spent for the machine process by achieving a maximum rate of deceleration for the first cutting tool in decelerating towards the reference speed $S_R$. Furthermore, method 500 takes into account linear deceleration for decelerating the second cutting tool when the second cutting tool is forming threads in the hole.

Figure 6:
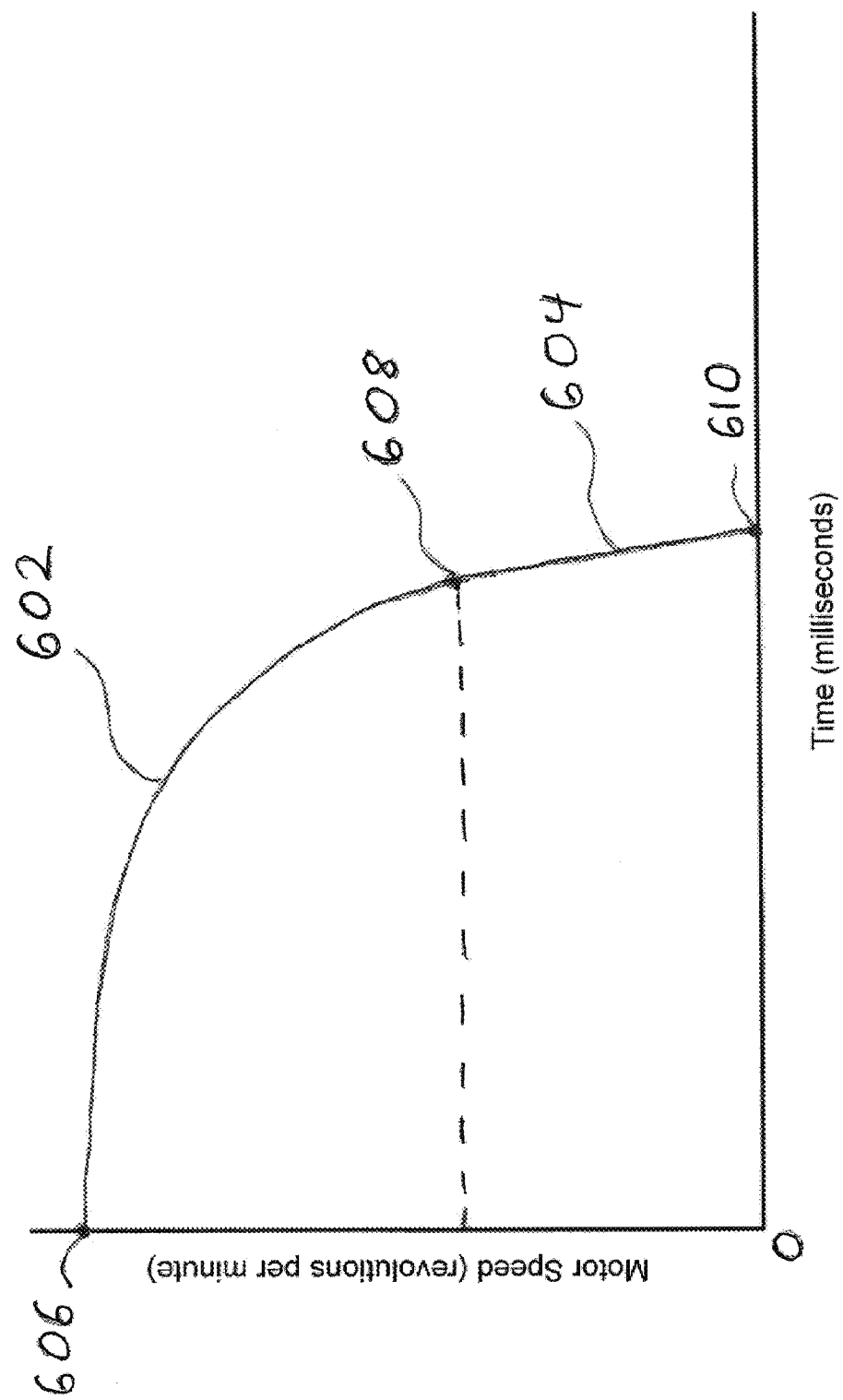
FIG. 6 illustrates an example of a non-linear deceleration profile and a linear deceleration profile, in accordance with various aspects of the subject disclosure.

FIG. 6 illustrates an example of non-linear deceleration profile 602 and linear deceleration profile 604, in accordance with various aspects of the subject disclosure. In FIG. 6, a sample plot of the speed of motor 304 in RPM versus time in milliseconds is shown. Non-linear deceleration profile 602 and linear deceleration profile 604 illustrate an example of the deceleration of motor 304 when motor 304 is decelerating according to method 500 of FIG. 5. For example, non-linear deceleration profile 602 and linear deceleration profile 604 illustrate the deceleration of motor 304 when the first cutting tool is being decelerated to a stop so that machine tool 102 may switch to the second cutting tool. Non-linear deceleration profile 602 illustrates an example of motor 304 decelerating according to equation (1) from point 606 to switch point 608. For example, motor 304 is decelerated non-linearly from point 606 to switch point 608. Switch point 608 is a point at which motor 304 changes from being decelerated non-linearly to being decelerated linearly. Linear deceleration profile 604 illustrates an example of motor 304 decelerating according to a linear rate of deceleration (e.g., the reference rate of deceleration $D_R$ as shown in step S514 of FIG. 5) from switch point 608 to point 610.

Figure 7:
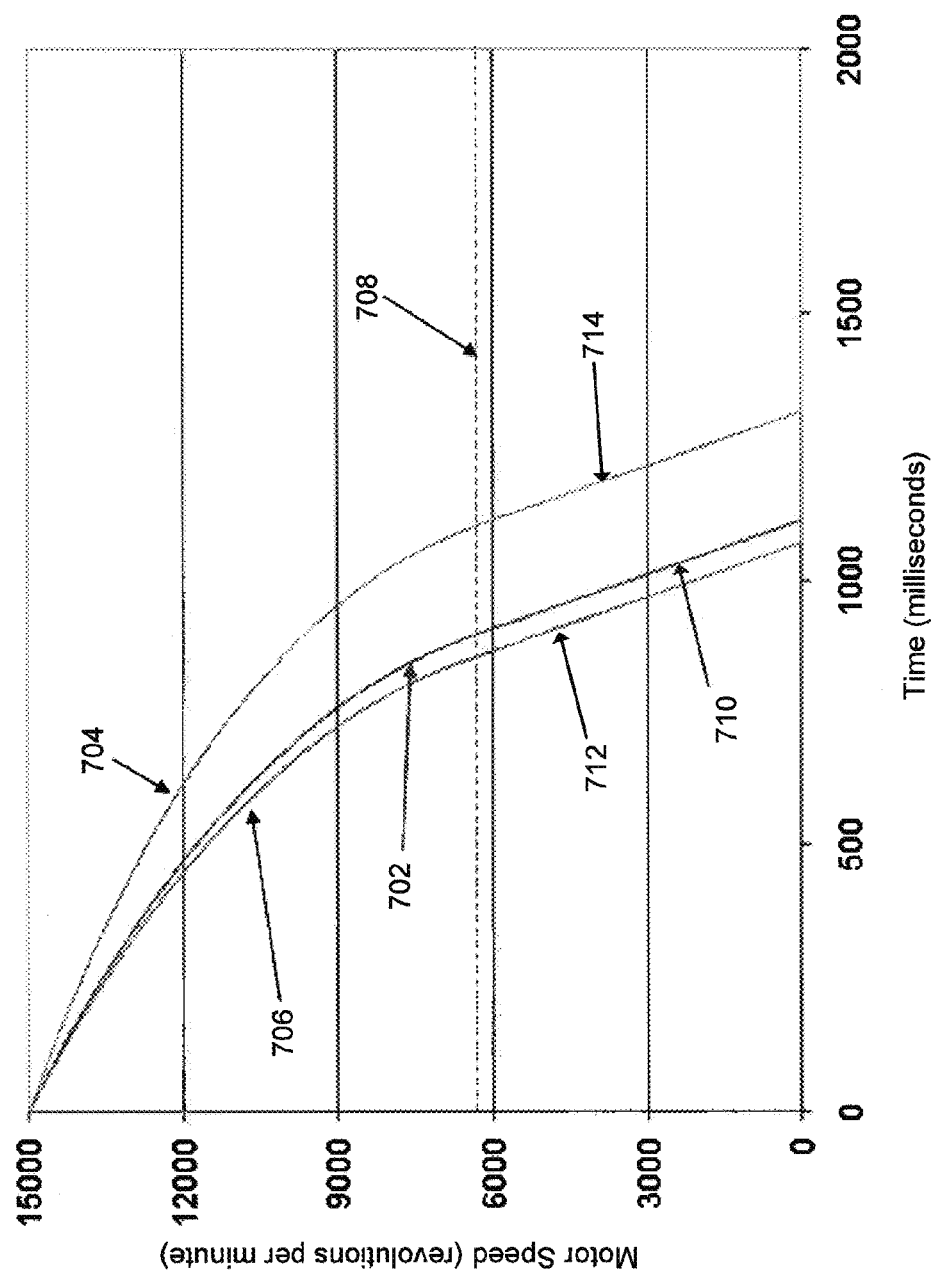
FIG. 7 illustrates examples of non-linear deceleration profiles and linear deceleration profiles, in accordance with various aspects of the subject disclosure.

FIG. 7 illustrates examples of non-linear deceleration profiles and linear deceleration profiles, in accordance with various aspects of the subject disclosure. Non-linear deceleration profile 702 and linear deceleration profile 710 illustrate an example of the deceleration of motor 304 when motor 304 is decelerating according to method 500 of FIG. 5. In this example, the switch point speed 708 (e.g., the reference speed $S_R$) is selected at 6,300 RPM. Non-linear deceleration profile 702 illustrates an example of motor 304 decelerating according to equation (1), with $K_1=1$ and $K_2=0$, from a maximum rotational speed of motor 304 at 15,000 RPM to the switch point speed 708 at 6,300 RPM. Linear deceleration profile 710 illustrates an example of motor 304 decelerating according to a linear rate of deceleration (e.g., the reference rate of deceleration $D_R$) from the switch point speed 708 at 6,300 RPM to a complete stop at zero RPM.

Non-linear deceleration profile 706 and linear deceleration profile 712 also illustrate an example of the deceleration of motor 304 when motor 304 is decelerating according to method 500 of FIG. 5. Under non-linear deceleration profile 706, motor 304 is decelerated using the same parameters as non-linear deceleration profile 702 (e.g., the present speed $S_P$, the reference speed $S_R$, and the reference rate of deceleration $D_R$) except that the calibration constants are different. For example, non-linear deceleration profile 706 illustrates an example of motor 304 decelerating according to equation (1) using the same parameters as non-linear deceleration profile 702, except that $K_1=1.05$ and $K_2=0$. As a result of the adjustment to the calibration constants, motor 304 is decelerated at a faster rate under non-linear deceleration profile 706 and linear deceleration profile 712 than the rate under non-linear deceleration profile 702 and linear deceleration profile 710. In other words, motor 304 takes less time to reach a complete stop at zero RPM under non-linear deceleration profile 706 and linear deceleration profile 712 than under non-linear deceleration profile 702 and linear deceleration profile 710.

Non-linear deceleration profile 704 and linear deceleration profile 714 also illustrate an example of the deceleration of motor 304 when motor 304 is decelerating according to method 500 of FIG. 5. Under non-linear deceleration profile 704, motor 304 is decelerated using the same parameters as non-linear deceleration profile 702 (e.g., the present speed $S_P$, the reference speed $S_R$, and the reference rate of deceleration $D_R$) except that the calibration constants are different. For example, non-linear deceleration profile 704 illustrates an example of motor 304 decelerating according to equation (1) using the same parameters as non-linear deceleration profile 702, except that $K_1=1$ and $K_2=100000$. As a result of the adjustment to the calibration constants, motor 304 is decelerated at a slower rate under non-linear deceleration profile 704 and linear deceleration profile 714 than the rate under non-linear deceleration profile 702 and linear deceleration profile 710. In other words, motor 304 takes more time to reach a complete stop at zero RPM under non-linear deceleration profile 704 and linear deceleration profile 714 than under non-linear deceleration profile 702 and linear deceleration profile 710.

The foregoing description is provided to enable a person skilled in the art to practice the various configurations described herein. While the present invention has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the scope of the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for decelerating a motor in a computer numerical controlled (CNC) machine tool, the method comprising:
    calculating a present rate of deceleration $D_P$, for a motor of a motor drive system in a CNC machine tool, based on a present speed $S_P$ of the motor, a reference speed $S_R$ of the motor, and a reference rate of deceleration $D_R$ of the motor; and
    decelerating the motor from the present speed $S_P$ according to the present rate of deceleration $D_P$,
    wherein the motor drive system comprises a maximum power rating, the maximum power rating defining a maximum power, generated by the motor while decelerating, that can be dissipated without overloading the motor drive system,
    wherein the reference rate of deceleration $D_R$ is a rate of deceleration such that power, generated by the motor while decelerating from the reference speed $S_R$ according to the reference rate of deceleration $D_R$, is equal to the maximum power rating, and
    wherein power, generated while decelerating the motor from the present speed $S_P$ according to the present rate of deceleration $D_P$, is equal to or less than the maximum power rating.

2. The method of claim 1, wherein the present rate of deceleration $D_P$ is given by $$K_1 \geq \frac{K_2}{D_R\left(\frac{S_R}{S_P}\right)^2}.$$

where $K_1$ and $K_2$ are calibration constants and $$D_R\left(\frac{S_R}{S_P}\right)^2 K_1 - K_2,$$

3. The method of claim 2, wherein $K_1=1$ and $K_2=0$.
4. The method of claim 1,
    wherein if the present speed $S_P$ of the motor is greater than the reference speed $S_R$, the present rate of deceleration $D_P$ is given by $$D_R\left(\frac{S_R}{S_P}\right)^2 K_1 - K_2,$$

where $K_1$ and $K_2$ are calibration constants $$K_1 \geq \frac{K_2}{D_R\left(\frac{S_R}{S_P}\right)^2},$$

and
wherein if the present speed $S_P$ of the motor is less than or equal to the reference speed $S_R$, the present rate of deceleration $D_P$ is equal to the reference rate of deceleration $D_R$.

5. The method of claim 1, wherein the motor drive system comprises one or more power dissipators, wherein the maximum power rating is an average power rating of the one or more power dissipators, and wherein the method further comprises dissipating, with the one or more power dissipators, power generated while decelerating the motor from the present speed $S_P$ according to the present rate of deceleration $D_P$ such that the power dissipated is equal to or less than the maximum power rating.

6. The method of claim 5, wherein the one or more power dissipators comprise at least one of a braking resistor, a transistor, and a capacitor.

7. A computer numerical controlled (CNC) machine tool system comprising:
a motor drive system comprising a motor;
a controller configured to calculate a present rate of deceleration $D_P$ for the motor based on a present speed $S_P$ of the motor, a reference speed $S_R$ of the motor, and a reference rate of deceleration $D_R$ of the motor, the controller further configured to execute an instruction for decelerating the motor from the present speed $S_P$ according to the present rate of deceleration $D_P$,
wherein the motor drive system comprises a maximum power rating, the maximum power rating defining a maximum power, generated by the motor while decelerating, that can be dissipated without overloading the motor drive system,
wherein the reference rate of deceleration $D_R$ is a rate of deceleration such that power, generated by the motor while decelerating from the reference speed $S_R$ according to the reference rate of deceleration $D_R$, is equal to the maximum power rating, and
wherein power, generated while decelerating the motor from the present speed $S_P$ according to the present rate of deceleration $D_P$, is equal to or less than the maximum power rating.

8. The system of claim 7, wherein the motor drive system comprises:
a drive unit configured to receive the instruction from the controller and supply power to the motor based on the instruction; and
an encoder configured to determine the present speed $S_P$ of the motor, the encoder further configured to provide information based on the present speed $S_P$ of the motor to the controller, wherein the controller is further configured to receive the information based on the present speed $S_P$.

9. The system of claim 7, wherein the present rate of deceleration $D_P$ is given by $$D_R\left(\frac{S_R}{S_P}\right)^2 K_1 - K_2,$$

where $K_1$ and $K_2$ are calibration constants and $$K_1 \geq \frac{K_2}{D_R\left(\frac{S_R}{S_P}\right)^2}.$$

10. The system of claim 9, wherein $K_1=1$ and $K_2=0$.
11. The system of claim 7,
wherein if the present speed $S_P$ of the motor is greater than the reference speed $S_R$, the present rate of deceleration $D_P$ is given by $$D_R\left(\frac{S_R}{S_P}\right)^2 K_1 - K_2,$$

where $K_1$ and $K_2$ are calibration constants $$K_1 \geq \frac{K_2}{D_R\left(\frac{S_R}{S_P}\right)^2},$$

and
wherein if the present speed $S_P$ of the motor is less than or equal to the reference speed $S_R$, the present rate of deceleration $D_P$ is equal to the reference rate of deceleration $D_R$.

12. The system of claim 7, wherein the motor drive system comprises one or more power dissipators, wherein the maximum power rating is an average power rating of the one or more power dissipators, and wherein the controller is further configured to execute an instruction for dissipating, with the one or more power dissipators, power generated while decelerating the motor from the present speed $S_P$ according to the present rate of deceleration $D_P$ such that the power dissipated is equal to or less than the maximum power rating.

13. The system of claim 12, wherein the one or more power dissipators comprise at least one of a braking resistor, a transistor, and a capacitor.

14. A controller for a computer numerical controlled (CNC) machine tool system, the controller comprising:
a memory module containing executable instructions; and
a processor configured to execute the instructions to perform a method for:
calculating a present rate of deceleration $D_P$ for a motor of a motor drive system in a CNC machine tool based on a present speed $S_P$ of the motor, a reference speed $S_R$ of the motor, and a reference rate of deceleration $D_R$ of the motor; and
decelerating the motor from the present speed $S_P$ according to the present rate of deceleration $D_P$,
wherein the motor drive system comprises a maximum power rating, the maximum power rating defining a maximum power, generated by the motor while decelerating, that can be dissipated without overloading the motor drive system,
wherein the reference rate of deceleration $D_R$ is a rate of deceleration such that power, generated by the motor while decelerating from the reference speed $S_R$ according to the reference rate of deceleration $D_R$, is equal to the maximum power rating, and wherein power, generated while decelerating the motor from the present speed $S_P$ according to the present rate of deceleration $D_P$, is equal to or less than the maximum power rating.

15. The controller of claim 14, wherein the present rate of deceleration $D_P$ is given by $$D_R \left(\frac{S_R}{S_P}\right)^2 K_1 - K_2,$$

where $K_1$ and $K_2$ are calibration constants and $$K_1 \geq \frac{K_2}{D_R \left(\frac{S_R}{S_P}\right)^2}.$$

16. The controller of claim 15, wherein $K_1=1$ and $K_2=0$.

17. The controller of claim 14, wherein the motor drive system comprises one or more power dissipators, wherein the maximum power rating is an average power rating of the one or more power dissipators, and wherein the method further comprises dissipating, with the one or more power dissipators, power generated while decelerating the motor from the present speed $S_P$ according to the present rate of deceleration $D_P$ such that the power dissipated is equal to or less than the maximum power rating.

18. A machine-readable medium encoded with executable instructions for decelerating a motor in a computer numerical controlled (CNC) machine tool, the instructions comprising code for:

calculating a present rate of deceleration $D_P$, for a motor of a motor drive system in a CNC machine tool, based on a present speed $S_P$ of the motor, a reference speed $S_R$ of the motor, and a reference rate of deceleration $D_R$ of the motor; and decelerating the motor from the present speed $S_P$ according to the present rate of deceleration $D_P$, wherein the motor drive system comprises a maximum power rating, the maximum power rating defining a maximum power, generated by the motor while decelerating, that can be dissipated without overloading the motor drive system, wherein the reference rate of deceleration $D_R$ is a rate of deceleration such that power, generated by the motor while decelerating from the reference speed $S_R$ according to the reference rate of deceleration $D_R$, is equal to the maximum power rating, and wherein power, generated while decelerating the motor from the present speed $S_P$ according to the present rate of deceleration $D_P$, is equal to or less than the maximum power rating.

19. The machine-readable medium of claim 18, wherein the present rate of deceleration $D_P$ is given by $$D_R \left(\frac{S_R}{S_P}\right)^2 K_1 - K_2,$$

where $K_1$ and $K_2$ are calibration constants and $$K_1 \geq \frac{K_2}{D_R \left(\frac{S_R}{S_P}\right)^2}.$$

20. The machine-readable medium of claim 19, wherein $K_1=1$ and $K_2=0$.

* * * * *

UNITED STATES PATENT AND TRADEMARK OFFICE
CERTIFICATE OF CORRECTION

PATENT NO. : 8,299,742 B2
APPLICATION NO. : 12/750459
DATED : October 30, 2012
INVENTOR(S) : Joseph V. Soliman et al.

Page 1 of 1

It is certified that error appears in the above-identified patent and that said Letters Patent is hereby corrected as shown below:

IN THE CLAIMS:

In Column 14, Lines 52-62

Replace " $K_1 \geq \dfrac{K_2}{D_R \left(\dfrac{S_R}{S_P}\right)^2}.$ where $K_1$ and $K_2$ are calibration constants and $D_R \left(\dfrac{S_R}{S_P}\right)^2 K_1 - K_2,$ "

with -- $D_R \left(\dfrac{S_R}{S_P}\right)^2 K_1 - K_2,$ where $K_1$ and $K_2$ are calibration constants and $K_1 \geq \dfrac{K_2}{D_R \left(\dfrac{S_R}{S_P}\right)^2}.$ --

Signed and Sealed this
Fourteenth Day of May, 2013

Teresa Stanek Rea
*Acting Director of the United States Patent and Trademark Office*